US012572406B2

(12) United States Patent
Khemani et al.

(10) Patent No.: US 12,572,406 B2
(45) Date of Patent: Mar. 10, 2026

(54) ALERT GENERATION BY AN INCIDENT MONITORING SYSTEM

(71) Applicants: Atlassian Pty Ltd., Sydney (AU); Atlassian US, Inc., San Francisco, CA (US)

(72) Inventors: Ankesh Khemani, Bangalore (IN); Akshar Prasad, Bangalore (IN)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 23 days.

(21) Appl. No.: 17/956,719

(22) Filed: Sep. 29, 2022

(65) Prior Publication Data

US 2024/0111616 A1     Apr. 4, 2024

(51) Int. Cl.
G06F 11/00        (2006.01)
G06F 11/07        (2006.01)

(52) U.S. Cl.
CPC ...... G06F 11/0784 (2013.01); G06F 11/0706 (2013.01); G06F 11/0721 (2013.01); G06F 11/0751 (2013.01); G06F 11/076 (2013.01)

(58) Field of Classification Search
CPC .............. G06F 11/0751; G06F 11/076; G06F 11/0781; G06F 11/327; G06F 11/0784; G06F 11/0766; G06F 11/3438; G06Q 50/01
See application file for complete search history.

(56) References Cited

U.S. PATENT DOCUMENTS

| | | | | |
|---|---|---|---|---|
| 9,805,523 | B2 * | 10/2017 | Zinchenko | ............. G07C 5/008 |
| 2015/0066814 | A1 * | 3/2015 | Allen | ...................... G06F 40/30 |
| | | | | 706/11 |
| 2018/0137520 | A1 * | 5/2018 | Schmidt | ............. G06Q 30/0201 |
| 2020/0026589 | A1 * | 1/2020 | Ghosh | ................. G06F 11/0793 |
| 2022/0342745 | A1 * | 10/2022 | Gonzalez Macias | ........................ |
| | | | | G06F 11/0781 |

(Continued)

OTHER PUBLICATIONS

Alharthi, Khalid Ayedh et al., Sentiment Analysis based Error Detection for Large-Scale Systems, 2021, IEEE (Year: 2021).*

(Continued)

*Primary Examiner* — Marc Duncan
(74) *Attorney, Agent, or Firm* — Brownstein Hyatt Farber Schreck, LLP

(57) ABSTRACT

Method and computer readable medium for generating alerts are disclosed. The method includes retrieving a plurality of content items created or updated in a particular time period at a social media platform in relation to a software application of interest, and determining one or more sentiments associated with each of the plurality of content items. The one or more sentiments determined based on textual data of the plurality of content items. The method further includes determining whether a potential incident has occurred in relation to the software application of interest based at least on the one or more sentiments associated with the plurality of content items. In response to determining that a potential incident has occurred in relation to the software application of interest, the method further includes generating an alert message indicating the potential incident and communicating the alert message to a monitoring system.

16 Claims, 5 Drawing Sheets

(56) References Cited

U.S. PATENT DOCUMENTS

| | | | |
|---|---|---|---|
| 2023/0103840 A1* | 4/2023 | Yeddu ................. | G06F 11/3428 |
| | | | 714/57 |
| 2023/0161957 A1* | 5/2023 | Li .......................... | G06N 20/00 |
| | | | 704/9 |
| 2024/0211695 A1* | 6/2024 | Srinivasan .............. | G06F 40/30 |

OTHER PUBLICATIONS

Bhatia, Sumit et al., Monitoring and Analyzing Customer Feedback Through Social Media Platforms for Identifying and Remedying Customer Problems, 2013, ACM (Year: 2013).*

Verma, Ayushi et al., Geo-Spatial Clustering of Sentiments on Social Media, 2018, IEEE (Year: 2018).*

Sherchan, W. et al., Harnessing Twitter and Instagram for disaster management, 2017, IBM (Year: 2017).*

Wikipedia, API, last edited Aug. 2022, https://en.wikipedia.org/w/index.php?title+API&oldid=1106469514 (Year: 2022).*

* cited by examiner

300

302

Processing unit

306

System memory

308

Volatile memory

310

Non-transient memory

304

312

User input/ output

314

Communications interface(s)

316

140

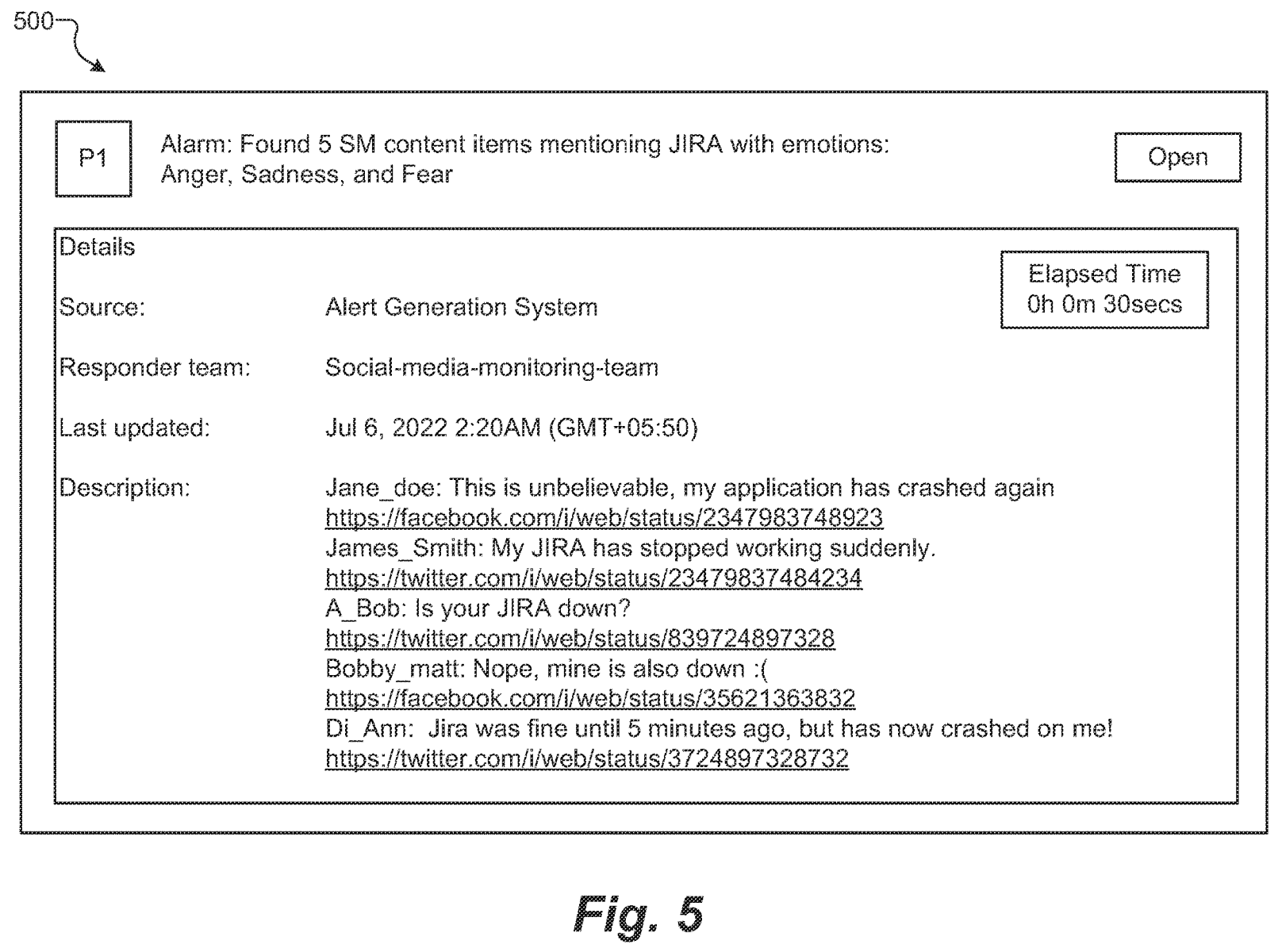

500

| P1 | Open |

Details

Alarm: Found 5 SM content items mentioning JIRA with emotions:
Anger, Sadness, and Fear Elapsed Time
0h 0m 30secs Source:　　　　Alert Generation System Responder team:　Social-media-monitoring-team Last updated:　　Jul 6, 2022 2:20AM (GMT+05:50)

Description:　　Jane_doe: This is unbelievable, my application has crashed again
https://facebook.com/i/web/status/23479837484923
James_Smith: My JIRA has stopped working suddenly.
https://twitter.com/i/web/status/23479837484234
A_Bob: Is your JIRA down?
https://twitter.com/i/web/status/83972489732B
Bobby_matt: Nope, mine is also down :(
https://facebook.com/i/web/status/35621363832
Di_Ann: Jira was fine until 5 minutes ago, but has now crashed on me!
https://twitter.com/i/web/status/37248973287 32

*Fig. 5*

ALERT GENERATION BY AN INCIDENT MONITORING SYSTEM

TECHNICAL FIELD

The present disclosure generally relates to incident monitoring systems for software applications, and in particular, to automatically detecting potential incidents and generating corresponding alerts.

BACKGROUND

Various methods, apparatuses, and systems are configured to provide techniques for generating alerts in software application monitoring systems. Applicant has identified many deficiencies and problems associated with existing methods, apparatuses, and systems for generating alerts in such software application monitoring systems. Through applied effort, ingenuity, and innovation, these identified deficiencies and problems have been solved by developing solutions that are in accordance with the embodiments of the present disclosure, many examples of which are described in detail herein.

SUMMARY

According to a first aspect of the present disclosure a computer-implemented method is provided. The method includes retrieving a plurality of content items created or updated in a particular time period at a social media platform in relation to a software application of interest, and determining one or more sentiments associated with each of the plurality of content items. The one or more sentiments determined based on textual data of the plurality of content items. The method further includes determining whether a potential incident has occurred in relation to the software application of interest based at least on the one or more sentiments associated with the plurality of content items. In response to determining that a potential incident has occurred in relation to the software application of interest, the method further includes generating an alert message indicating the potential incident and communicating the alert message to a monitoring system.

According to another aspect of the present disclosure there is provided a non-transitory computer readable medium. The non-transitory computer readable medium includes instructions, which when executed by a processing unit, cause the processing unit to: retrieve a plurality of content items created or updated in a particular time period at a social media platform in relation to a software application of interest and determine one or more sentiments associated with the plurality of content items. The sentiments may be determined based on textual data of the plurality of content items. The memory further includes instructions, which cause the processing unit to determine whether a potential incident has occurred in relation to the software application of interest based at least on the one or more sentiments associated with the plurality of content items, and in response to determining that a potential incident has occurred in relation to the software application of interest: generate an alert message indicating the potential incident, and communicate the alert message to a monitoring system.

In certain other embodiments of the present disclosure a computer processing system for generating alerts is disclosed. The system includes a processing unit and non-transitory computer readable medium including instructions, which when executed by the processing unit, cause the computer processing system to perform the method described above.

BRIEF DESCRIPTION OF THE DRAWINGS

In the drawings:

FIG. 5 is an example alert generated by the alert generation system according to some embodiments of the present disclosure.

Figure 1:
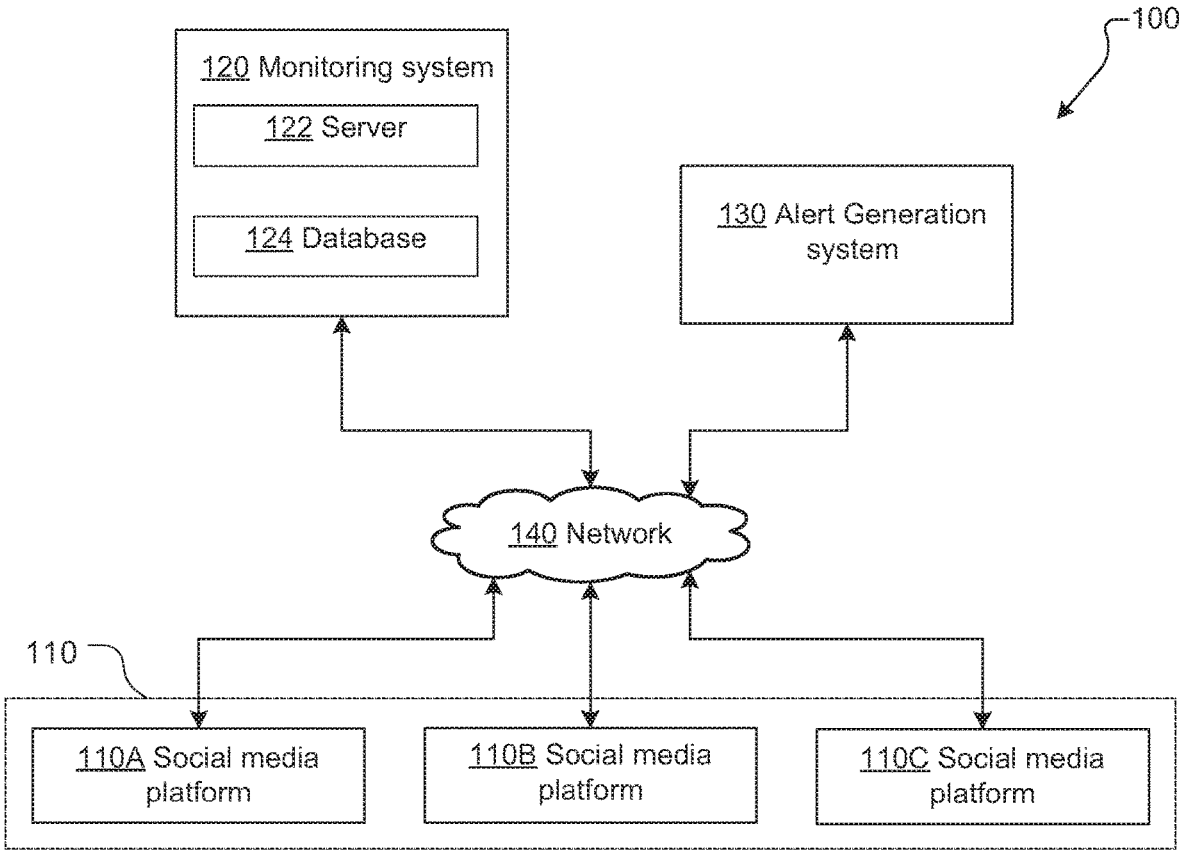
FIG. 1 is a diagram depicting a networked environment in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description, numerous specific details are set forth in order to provide a thorough understanding of the claimed invention. It will be apparent, however, that the claimed invention may be practiced without these specific details. In some instances, well-known structures.

Overview

Various embodiments of the present disclosure address technical problems associated with efficiently, reliably, and automatically generating alerts for software applications. In particular, the disclosed techniques can be utilized by a software application monitoring system to automatically detect potential incidents in one or more software applications monitored by the system based on social media messages, and generating alerts based on that detection.

A software application monitoring system (referred to hereinafter as monitoring system) may be used to assist in managing and tracking incidents that may occur in one or more of the monitored software applications. An incident is generally defined as an issue that affects multiple users—e.g., an event in a software application that has caused disruption to or a reduction in the quality of service of a software application or service to a large number of people. Incidents can vary widely in severity, ranging from an entire global web service crashing to a small number of users having intermittent errors. Incidents often require an emergency response/solution.

Generally speaking, a monitoring system can be integrated with one or more third party monitoring tools that are in turn interfaced with one or more software applications to provide a single interface for dealing with incidents detected by the integrated monitoring tools. Monitoring systems typically include a backend server that is connected to the monitoring tools for receiving notifications from these tools. The server generates and/or manages incidents based on the received notifications. Further, monitoring systems generally include a frontend client that provides statuses of the incidents and allows agents to manage the incidents. For instance, the front end allows agents to perform certain actions on the incidents including, assigning an incident to a specific support engineer, changing a priority level of an incident, deleting an incident, commenting on an incident, creating an incident, etc. In addition to these features, monitoring systems are also configured to alert relevant support engineers (or responders) when an incident is detected.

An example of such a monitoring system is the Opsgenie® incident management system provided by Atlassian, Inc., which enables the collection and management of software alerts for various complex software applications.

Individual monitoring tools that are integrated with the monitoring system may be configured to generate alerts that describe a maintenance-critical state of software applications they are monitoring. Because of the number of software applications that can be monitored, a large number of alerts may be generated by the monitoring tools at any selected time interval. In some circumstances, a subset of the noted software alerts may collectively relate to a common maintenance-critical property of the corresponding software application.

For example, consider a scenario in which a first software module of a software application that is configured to perform database retrieval experiences a failure. In this scenario, in addition to the first software module, each of the frontend software modules of the software application that rely on successful data retrieval operations from a target database may cause the monitoring tools to generate independent alerts that describe a maintenance-critical state of those frontend software modules. While these frontend-generated software alerts describe valid maintenance-critical conditions, may not be independently valuable for detecting maintenance needs of the overall software application and addressing those detected maintenance needs.

As another example, consider another scenario in which a first software module of a software application that is configured to act as a networking point for a target network experiences a failure. In this scenario, in addition to the first software module, each of the software modules that rely on successful retrieval of data using the target network may generate independent alerts that describe a maintenance-critical state of those software modules. Similar to the frontend-generated software alerts described in relation to the previous example, the downstream-generated software alerts described in relation to this example may not be independently valuable for detecting maintenance needs of the overall software application and addressing those detected maintenance needs.

As the examples above illustrate, a monitoring system may have to assess alerts individually, which results in the need for performing additional processing operations and using unnecessary computational resources. This problem is amplified as the number of software modules, features, or services in a complex software application grows larger, which in turn leads to data processing problems associated with real-time processing of a large number of alerts.

As the foregoing description will illustrate, a software alert approach that relies exclusively on individual processing of alerts generated by monitoring tools of software applications is not scalable. It immediately becomes highly inefficient to process software alert objects on an individual level as the software application grows and dynamically changes.

To address the above-described challenges related to monitoring complex software applications, various embodiments of the present disclosure describe techniques for detecting potential incidents in software applications by monitoring social media messages associated with the software applications. As more and more users engage with social media platforms, these platforms have become increasingly important sources during emergency events providing real-time, first-hand reporting of incidents especially in customer facing software applications. Aspects of the present disclosure disclose an alert generation system that is configured to monitor social media messages generated by users of the monitored software application that are relevant to the monitored software applications and automatically raise alerts in the monitoring system when the alert generation system detects potential incidents based on the monitored social media messages.

In some embodiments, the presently disclosed alert generation system may identify localized incidents by clustering geo-spatial properties of the monitored social media messages.

By using the described techniques, various embodiments of the present disclosure generate alerts to potential incidents in real-time that can alert engineers of potential customer-facing incidents or outages in software applications in a single alert thereby increasing the efficiency and effectiveness of software applications and the monitoring system. In doing so, various embodiments of the present disclosure make substantial technical contributions to improving the efficiency and the effectiveness of monitoring systems.

System Overview

FIG. 1 depicts an exemplary environment 100 for generating alerts for potential incidents. The environment 100 includes one or more social media platforms 110A, 110B and 110C (collectively referred to as social media platforms 110), a monitoring system 120, and an alert generation system 130.

In general, social media platforms 110 are system entities that provide the means of interaction among users. Using such systems, users can create, share, and exchange information with other users in communities created in virtual environments. Examples of such platforms 110 include Internet-based applications such as Twitter®, Facebook®, Instagram®, and LinkedIn®, which allow creation and exchange of content items (including messages, posts, comments, and other interactions) through various methods.

In general, each social media platform 110 includes at least one server (not shown), at least one database (not shown), and at least one server application (not shown) running on the server. In addition, each social media platform 110 may have a client application that provides client-side functionality of the social media platform. The client applications may be installed and/or executed on users' client devices (not shown) and may work in tandem with the server application to enable users to interact with the corresponding social media platform.

The social media server applications manage interactions between users, maintain user accounts (e.g., in the one or more databases), and activity performed by the users on the social media platforms in association with their user accounts.

Social media platforms 110 also include a number of application programming interfaces (APIs) to enable third party software applications to retrieve data from or communicate data to the social media platforms.

The monitoring system 120 is a system entity that hosts a monitoring application that is configured to receive alerts related to one or more monitored software applications and manage those alerts. The monitoring system 120 may include one or more servers (e.g., 122) for hosting the monitoring application and one or more storage devices (e.g., database 124) for storing application specific data.

In order to run the monitoring application, the server 122 includes one or more application programs, libraries, APIs, or other software elements that implement the features and functions of the application. The database 124 stores product data. Product data generally includes: data defining the operation of the monitoring application (for example, user accounts, user permissions, and the like); and application data (e.g., the content hosted/maintained by the application, which can be incident data, schedules of engineers, status of incidents, etc.). Database 124 may be provided by a database server (not shown) which may be hosted by server 122 but is more typically hosted on a separate physical computer in communication (directly or indirectly via one or more networks 140) with the server 122.

The alert generation system 130 is communicatively coupled between the social media platforms 110 and the monitoring system 120. In particular, it receives social media content from the social media platforms 110, analyses this content to determine whether the content indicates a potential incident has occurred in one or more software applications monitored by the monitoring system 120 and generates a corresponding alert or not. In order to do so, the alert generation system 130 includes a plurality of sub-systems or modules.

Figure 2:
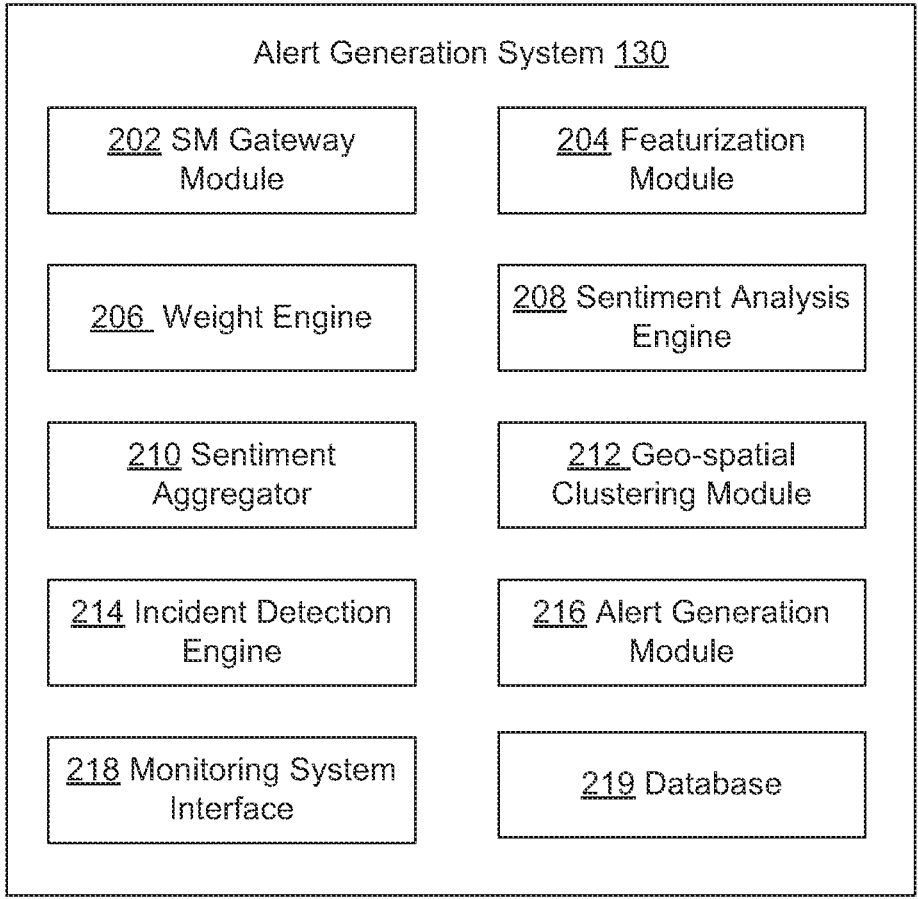
FIG. 2 is a diagram depicting an alert generation system according to aspects of the present disclosure.

FIG. 2 is a block diagram illustrating these sub-systems or modules of the alert generation system 130. In particular, as seen in FIG. 2, alert generation system 130 includes a social media (SM) gateway module 202, a featurization module 204, a weight engine 206, a sentiment analysis engine 208, a sentiment aggregator 210, a geo-spatial clustering module 212, an incident detection engine 214, an alert generation module 216, a monitoring system interface 218, and a database 219.

As noted earlier, the social media platforms 110 include one or more APIs to allow third party software applications to communicate with the social media platforms 110. The SM gateway module 202 integrates with one or more such APIs to retrieve social media content related to the one or more software applications monitored by the monitoring system 120. In some examples, the SM gateway module 202 may be configured to retrieve just the social media content items—e.g., messages, posts, tweets, comments, etc. In other embodiments, the SM gateway module 202 may be configured to also retrieve interaction data associated with content items such as shares, retweets, likes, dislikes, comments, etc., and associated metadata such as time logs associated with the creation of the content and interactions, information about the users (e.g., creator and interactors) associated with the content, information about the location of the users (e.g., creator and interactors) associated with the content, etc.

The SM gateway module 202 is also configured to generate content item descriptors based on this received information and store the content item descriptors in the database 219.

The featurization module 204 is configured to extract and process textual data from the content item descriptors. In some embodiments, the featurization module 204 may be configured to segment larger textual items (e.g., comprising 10-15 sentences) into smaller segments (e.g., comprising 2-3 sentences).

The weight engine 206 may be configured to apply weight values to social media content items fetched from the social media platforms 110 based on one or more factors. In one instance, weights may be assigned based on number of interactions with the content item. For example, if a social media post has been shared or "retweeted" multiple times, the weight engine 206 may assign a weight to that content item that is higher than a weight it may assign to another content item that has not been shared or retweeted or has been shared fewer number of times. In another example, if a social media post has been "disliked" multiple times, the weight engine 206 may assign a lower weight to that content item than to another content item that has not been disliked or has been liked. Similarly, weights may be assigned based on the rate of interaction with the content items. If a message has been retweeted or shared more frequently in a particular period of time it may be assigned a higher weight than a message that has been retweeted or shared less frequently in that particular period of time.

It will be appreciated that the weight engine 206 assigns weights to social media content items not based on the textual data but based on the degree and/or rate of interactions by other users with that content item. Therefore, the weight engine 206 requires interaction data about a social media content item and information about when those interactions occurred.

The sentiment analysis engine 208 is configured to receive textual data (e.g., from the content item descriptors) and provide an output that consists of one or more sentiment labels and corresponding sentiment scores. The sentiment labels indicate the sentiments that were detected in the textual data and the sentiment scores indicate the level of that sentiment identified in the textual data. For instance, the sentiment analysis engine 208 may identify negative and positive sentiments in input textual data and may assign scores such as 0.8 negative and 0.3 positive, which indicates that on a scale of 0 to 1, the sentiment analysis engine 208 detected some positive sentiments but a lot of negative sentiments in the textual data.

The sentiment analysis engine 208 arrives at the sentiment labels and scores by identifying, extracting, quantifying, and studying effective states and subjective information in textual data using natural language processing, text analysis, and computation linguistics.

In some examples, the sentiment analysis engine 208 utilizes a rule-based model to determine the sentiment labels and scores. In this technique, known root words are labelled as either being positive, negative, or neutral and stored in a database. Textual data is then fed to the model, which segments the received textual data into words and retrieves sentiments for those words by performing a lookup in the database. It may then average out the sentiments for the words to arrive at a sentiment label and score for the entire textual sample.

To achieve more accurate results, the sentiment analysis engine 208 may utilize machine-learning models such as convoluted neural networks (CNN). Convoluted networks include interconnected artificial nodes, called 'neurons' that generally mimic a biological neural network. Typically, the network includes a set of adaptive weights, e.g., numerical parameters that are tuned by training the network to perform certain complex functions. Training a CNN essentially means selecting one model from a set of allowed models that minimizes a cost criterion. There are numerous algorithms available for training neural network models; most of them can be viewed as a straightforward application of optimization theory and statistical estimation.

In the present disclosure, the CNN may be trained to classify input text data into one or more sentiment classes or labels and assign a sentiment score for each of the sentiment classes.

To be able to perform such classifications, the CNN is trained by providing it copious amounts of textual data that is pre-labelled with the sentiment classes and scores. The model uses this training data to assign weights to the different neurons of the network that result in the arriving at the corresponding sentiment labels and scores of the training data. Then, the model is provided unlabeled test data. During the testing phase, test data is fed to the sentiment analysis engine 208 and based on the weights of the networks, it classifies the textual data under one or more of the sentiment labels it was trained on and assigns a sentiment score indicating the severity of the sentiment detected in the textual data. If the assigned sentiment label and/or score is incorrect, the CNN changes its weights to be more likely to produce the correct output. This process is repeated numerous times with large amounts of textual data, until the CNN can correctly assign the right sentiment labels and scores most of the times. It will be appreciated that the more the process is repeated, the more accurate the CNN may be.

In one embodiment, the CNN model is built based on a TensorFlow® machine learning system, utilizing Google's bidirectional encoder representations from transformers (BERT) natural language processing model that in trained by English Wikipedia and BooksCorpos.

Once the sentiment analysis engine 208 is trained, it is ready for use in the alert generation system 130. It retrieves processed textual data from the content item descriptors and produces an output indicating the one or more sentiments indicated by the textual data.

In some examples, the sentiment analysis engine 208 generates one or more of three sentiment labels for any given textual data: positive, neutral, and negative. A positive sentiment label generally indicates that the social media user who produced that content has expressed enthusiasm, happiness, or excitement. In contrast, a negative sentiment label generally indicates that the user has expressed anger, annoyance, or frustration. A neutral sentiment label generally indicates that the user is satisfied but has not expressed any particular feelings.

In alternative examples, the sentiment analysis engine 208 may generate more nuanced sentiment labels, e.g., it may generate one or more of the following sentiment labels for input text—happy, sad, surprise, joy, anger, fear, and love.

In some embodiments, a pre-trained sentiment analysis model may be utilized. Some examples of such sentiment analysis models include: bert-base-multilingual-uncased, finetune-sentiment-analysis-model-3000-samples, distilbert-base-uncased-emotion, and distilbert-base-uncased-emotion. In one example, sentiment analysis engine 208 utilizes the distilbert-base-uncased-emotion (DistilBERT) model. The DistilBERT model is a distilled version of the BERT model. This model is trained and fine-tuned on an emotion dataset of English Twitter messages with six basic emotions: anger, fear, joy, love, sadness, and surprise.

Returning to FIG. 2, the sentiment aggregator 210 is configured to combine sentiment labels and sentiment scores for smaller segments to compute aggregated sentiment labels and scores for a complete social media content item. For instance, if a larger content item was broken into two segments and one of the segments was assigned the senti-ment labels fear and anger having corresponding scores 0.3 and 0.8 and the other segment was assigned the sentiment labels anger and sadness having corresponding scores 0.7 and 0.2, the sentiment aggregator 210 it may be configured to assign all the sentiment labels assigned to the segments (e.g., fear, anger and sadness) to the content item and assign average corresponding sentiment scores (e.g., 0.15, 0.75, and 0.1, respectively).

The geo-spatial clustering module 212 is configured to identify a geo-cluster for a given content item. To do so, it utilizes geo-spatial clustering, which groups sets of spatial objects into groups called "clusters." Objects within a cluster show a high degree of similarity, whereas clusters are as much dissimilar as possible. In particular, the geo-spatial clustering module 212 may create cluster maps for the software applications monitored by the monitoring system. Each cluster map may be created based on the location of users of the software applications, the geographical areas in which the software applications are made available and/or areas in which the servers or databases for the software applications are present.

During implementation, the geo-spatial clustering module 212 may be configured to allocate a content item to a particular geo-cluster in a cluster map based on the associated software application and the location information provided in the metadata for the content item.

The incident detection engine 214 is configured to analyze the sentiment labels and scores, the geospatial clustering information (if available) and the weights (if available) to determine whether an incident has occurred. Operations of this engine will be described in relation to FIG. 4.

The alert generation module 216 is configured to generate an alert if the incident detection engine 137 determines that a potential incident has occurred. And the monitoring system interface is configured to communicate any alerts generated by the incident detection engine 137 to the monitoring system 120.

The database 219 stores content items, content item descriptors, interaction data, content item metadata and any other data required by the alert generation system to function, such as weight thresholds for different software applications, hyper-parameter thresholds for different software applications, and cluster maps for different software applications.

As illustrated in FIG. 1, communications between the various systems 110-130 are via the communication network 140. The communication network 140 is depicted as a single network in FIG. 1 for ease of depiction. However, in actual implementation, the various systems illustrated in FIG. 1 may communicate with each other over different communication networks. For example, the alert generation system 130 may communicate with the monitoring system 120 through a local area network (LAN), whereas it may communicate with the social media platforms 110 via a public network (e.g., the Internet).

While single server architecture has been described herein, it will be appreciated that the monitoring system 120 and alert generation system 130 can be implemented using alternative architectures. For example, in certain cases a clustered architecture may be used where multiple server computing instances (or nodes) are instantiated to meet system demand Conversely, in the case of small enterprises with relatively simple requirements the monitoring system 120 and alert generation system 130 may be a stand-alone implementation (e.g., single server computers) directly accessed/used by the end user).

It will be appreciated that although the environment 100 shows three social media platforms 110 and one monitoring system 120, this need not be the case in all implementations. In some implementations fewer or more social media platforms 110 may be interfaced with the alert generation system 130. Similarly, in those or other implementations, more than one monitoring system 120 may be interfaced with the alert generation system 130. Further, each of those monitoring systems may monitor one or more software applications without departing from the scope of the present disclosure.

Further, although the alert generation system 130 is depicted as an independent entity in communication with the monitoring system 120, this need not be the case in all implementations. In some cases, the alert generation system 130 may be part of the monitoring system 120 and may be implemented by the monitoring system server 122.

Further still, although the alert generation system 130 is depicted with sub-systems 202-219, this need not be the case in all implementations. In some implementations the alert generation system 130 may have fewer or more sub-systems or modules without departing from the scope of the present disclosure. For instance, in some embodiments, the alert generation system 130 may not include the weight engine 206 and/or the geo-spatial clustering module 212. In such cases, the incident detection engine 214 may be configured to determine whether an incident has occurred or not based on the sentiment labels and scores. Similarly, in other embodiments, the alert generation systems 130 may not segment large content items into smaller segments. In such cases, the sentiment aggregator 210 may not be required. In any case, the alert generation system 130 will generally require the sentiment analysis engine 208 and the incident detection engine 214.

Hardware Overview

The embodiments and features described herein are implemented by one or more special-purpose computing systems or devices. For example, in environment 100 each of the social media platforms 110, the monitoring system 120, and the alert generation system 130 is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further, alternatively, a special-purpose computing system may include one or more general-purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 3:
FIG. 3 is a block diagram of a computer processing system configurable to perform various features of the present disclosure.
Figure 3:
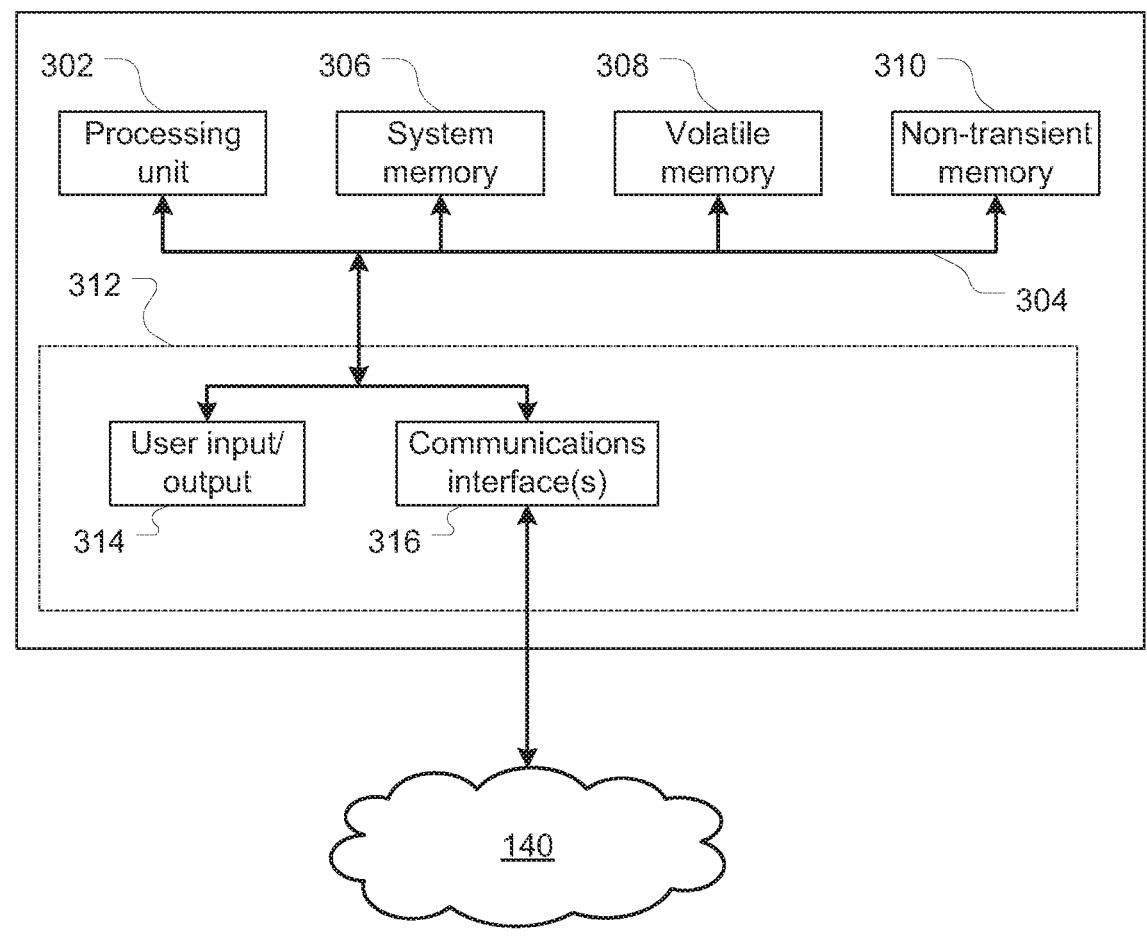

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302—for example a general or central processing unit, a graphics processing unit, or an alternative computational device). Computer processing system 300 may include a plurality of computer processing units. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304, processing unit 302 is in data communication with a one or more computer readable storage devices which store instructions and/or data for controlling operation of the processing system 300. In this example system 300 includes a system memory 306 (e.g., a BIOS), volatile memory 308 (e.g., random access memory such as one or more DRAM applications), and non-volatile (or non-transitory) memory 310 (e.g., one or more hard disks, solid state drives, or other non-transitory computer readable media). Such memory devices may also be referred to as computer readable storage media (or a computer readable medium).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g., networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, Wi-Fi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 300 connects—whether by wired or wireless means—include one or more input/output devices (indicated generally by input/output device interface 314). Input devices are used to input data into system 300 for processing by the processing unit 302. Output devices allow data to be output by system 300. Example input/output devices are described below; however, it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads (and/or other touch/contact sensing devices, including touch screen displays), microphones, accelerometers, proximity sensors, GPS devices, touch sensors, and/or other input devices. System 300 may also include or connect to one or more output devices controlled by system 300 to output information. Such output devices may include devices such as displays (e.g., cathode ray tube displays, liquid crystal displays, light emitting diode displays, plasma displays, touch screen displays), speakers, vibration applications, light emitting diodes/other lights, and other output devices. System 300 may also include or connect to devices which may act as both input and output devices, for example memory devices/computer readable media (e.g., hard drives, solid state drives, disk drives, compact flash cards, SD cards, and other memory/computer readable media devices) which system 300 can read data from and/or write data to, and touch screen displays which can both display (output) data and receive touch signals (input).

System 300 also includes one or more communications interfaces 316 for communication with a network, such as network 140 of environment 100. Via a communications interface 316 system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—e.g., computer readable instructions and data which, when executed by the processing unit 302, configure system 300 to receive, process, and output data. Instructions and data can be stored on non-transitory computer readable media accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application such as Microsoft Windows™, Apple macOS™, Apple iOS™, Android™ Unix™, or Linux™.

System 300 also stores or has access to applications which, when executed by the processing unit 302, configure system 300 to perform various computer-implemented processing operations described herein. For example, and referring to networked environment 100 of FIG. 1 above, social media platforms 110 include server applications which configure the social media platforms 110 to perform operations of the social media platforms, and alert generation system 130 includes a number of subsystems which are executed by one or more processing units 302 which configure the computer processing system(s) to perform the described alert generation system operations.

In some cases, part or all of a given computer-implemented method will be performed by a single computer processing system 300, while in other cases processing may be performed by multiple computer processing systems in data communication with each other.

Alert Generation Process

This section describes a computer-implemented method for automatically generating an alert according to aspects of the present disclosure.

Generally speaking, social media platforms 110 are not only used by people, but also by organizations to stay connected with their customers. Typically, most organizations or software products have a social media account that is monitored by one or more employees of the organization, who not only post content on the social media platform on behalf of the organization or software product but also respond to content created by other users in relation to the organization or software product.

To become a user of a social media, a person is typically required to create a user account for the person or organization/product. A user account is typically associated with one or more information items specific to a user such as entity name, public name or alias, business location, industry, etc. This account information may be added as metadata when a user creates content on the social media platforms.

One feature that has become a de facto standard in social media platforms 110 is the ability of a first user to name a second user or entity of the platform within the content created by the first user. In the present embodiment, this feature is referred to as "mention" and "mentioning" (e.g., the first user mentioned the second user/entity). There are several reasons for a first user to mention a second user/entity on a social media platform. For example, the first user may wish to start a conversation with the second user/entity. Social media platforms typically respond to detecting mentions by bringing the event to the attention of the mentioned user/entity in various ways (e.g., by showing a notification message or icon), which enables the mentioned user to respond, if so desired.

When a user of a social media platform 110 creates content through the system (e.g., by writing a text in an editor provided by the social media platform 110 or uploading a photo from their smartphone into the system), the social media platform 110 may associate some additional metadata with the user-created content. For instance, the social media platform 110 may provide the username, profile picture, location information or any other user information held by the social media platform 110.

Figure 4:
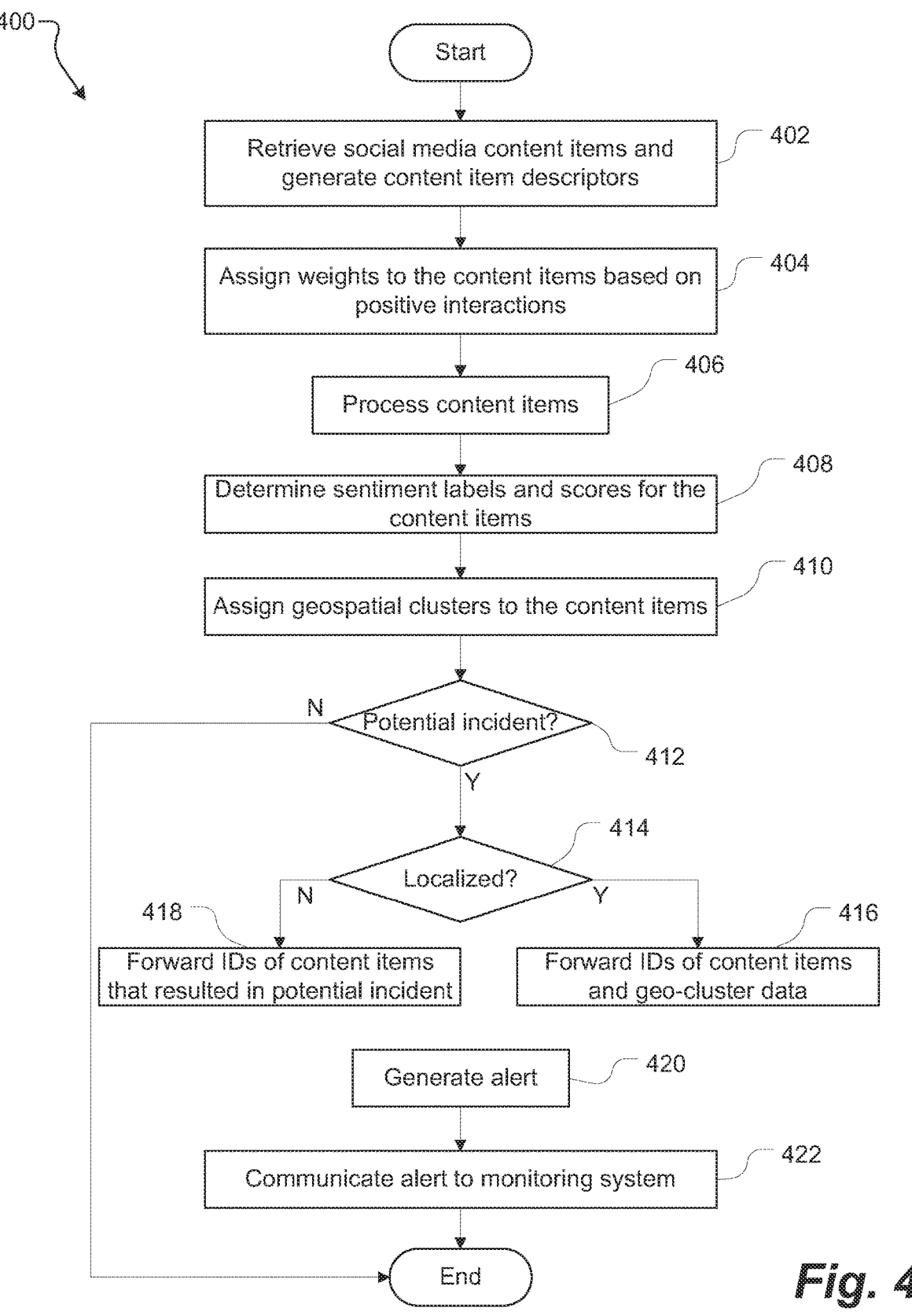
FIG. 4 is a flowchart illustrating an example method for detecting potential incidents according to some aspects of the present disclosure.

FIG. 4 is a flowchart illustrating an example method 400 performed by the alert generation system 130 to generate one or more alerts. In some embodiments, method 400 is performed periodically, e.g., every 10 minutes or every 30 minutes, and FIG. 4 shows one cycle of this method. Further, although the alert generation system 130 may service multiple monitoring systems 120 and each monitoring system may monitor multiple software applications, for ease of description, it is assumed that the alert generation system 130 services one monitoring system that monitors one software application.

Furthermore, in the method 400, wherever the term "content item" or "content items" is used, it is meant to encompass any posts, messages, tweets, comments or any other type of content created on a social media platform 110 that were either posted on the accounts of software applications monitored by the monitoring system 120 or "mentioned" the accounts of such monitored software applications.

The method 400 commences at step 402, where the SM gateway module 202 receives one or more social media content items from one or more of the social media platforms 110. In particular, the SM gateway module 202 may be configured to receive social media content items generated in the period since the last time method 400 was executed that are related to the software application monitored by the monitoring system 120. In some cases, the gateway module 202 may also receive content items that were generated before the relevant time period if any interactions with the content items have taken place in the relevant time period. For example, the gateway module 202 may be configured to receive a post that was created 24 hours ago, but was liked or shared within the last 10 or 30 minutes. In addition to or instead of the actual content items, the gateway module 202 may also receive interaction data associated with content items (e.g., how and when the content items were interacted with) and metadata information (e.g., geographical location of the content creators or interactors).

In some embodiments, the SM gateway module 202 may be configured to pull the content items from the social media platforms 110 in real time, e.g., by utilizing web-hooks (programmed into the software applications and tools hosted by the social media platforms 110) that notify the gateway module 202 when content items associated with one or more monitored software applications are available at the social media platforms 110. In other cases, it may pull the content items periodically by requesting the social media platforms 110 at predetermined intervals (e.g., every 10 minutes, every 30 minutes, etc.) to provide content items that were generated or interacted with in that interval.

In other embodiments, the social media platforms 110 may push content items to the gateway module 202 either in real time (e.g., whenever a content item is generated or interacted with) or at predetermined intervals (e.g., every 10 minutes, every 30 minutes, etc.).

The gateway module 202 is configured to inspect the content items and discard any content items that do not have any textual data or content. For example, content items that only include multimedia such as images, videos, audio files, etc., may be discarded. From the remaining content items, the gateway module 202 is configured to generate content item descriptors. Each descriptor may include the textual content from the item and metadata about the content item such as time of creation, location information, creator, etc.

In addition, the content item descriptors may include interaction information associated with the content items, such as number of likes, shares, etc., and the time associated with each such interaction.

If the monitoring system 120 monitors more than one software application, the gateway module 202 may also store information about the software application the content item is related to. Table A illustrates an example content item descriptor. Although a table has been used to illustrate the information stored in the content item descriptor, the relevant information need not be entered in a table and could be stored in any appropriate format (e.g., simple text file, a JSON file, an XML file, etc.)

TABLE A

| example content item descriptor | |
|---|---|
| Content item ID | 834739 |
| Time created | 23 Apr. 2022, 11:05 am |
| Time last updated | 23 Apr. 2022, 19:07 pm |
| Social media Platform ID | Facebook |
| Software application | Jira Align |

TABLE A-continued

| example content item descriptor | |
|---|---|
| Content item type | Text |
| Location data | Sydney, Australia |
| Content | "This is unbelievable, my application has crashed again" |
| No. of likes | 1 |
| No. of shares | 5 |
| Segments | — |
| Segment IDs | — |
| Weight | — |
| Sentiment label and score | — |
| Geo-cluster | — |
| Link to content item | https://facebook.com/i/web/status/2347983748923 |

As seen in table A, the content item descriptor includes some fields that are populated by the gateway module 202 upon receiving the content items and includes other fields that are not populated by the gateway module 202. These fields are updated by other modules in the alert generation system 130 as the method proceeds. Once created, the content item descriptors may be stored in the database 219 or passed on to the weight engine 206.

It will be appreciated that the content item descriptors may be stored in the database 219 for a period of time. The first time a content item is received by the gateway module 202, it creates a new record for the content item descriptor in the database 219. However, when the gateway module 202 receives the content item a subsequent time, e.g., because the content item has been interacted with recently, the gateway module 202 may not create a new record. Instead, it may simply update the counter of the corresponding interaction in the existing content item descriptor and may update the time last updated field.

Next, at step 404, the weight engine 206 assigns weights to the received content items based on interaction information (such as likes or shares). In some embodiments, the weight engine 206 inspects each of the content item descriptors to check the value of the "no. of likes" and "no. of shares" fields. The weight engine 206 may assign a weight to the content item based on these values. The weight may vary based on the type of interactions—e.g., likes may receive lower weights whereas shares may get higher weights. Weights may also vary based on the number of interactions, e.g., if a content item has been shared more number of times it may be assigned a higher weight than a content item that has been shared fewer number of times. Finally, weights may also vary based on the timing of the interactions. In one example, the weight engine 206 may be configured to assign weights in the 1-10 range where a weight of 1 is assigned to a message that has no interactions and a weight of 10 is applied to a message that has been re-shared and liked a threshold number of times in a particular period of time (e.g., last 30 minutes), respectively.

It will be appreciated that the thresholds for different weight scores may vary for different software applications. For example, if software application A has 1,000 followers or customers and software application B has a 1 million followers or customers, the number of likes or shares individual messages/posts receive for these software applications may vary greatly. For example, it may be very common for messages associated with software application B to be liked by 50 people in a short time span, but this may be rare for messages associated with software application A. To account for this, the weight engine 206 may maintain different weight thresholds for different software applications and may check the software application field in the content item descriptor to determine which set of threshold weights to apply for a given content item at this step.

In some cases, the weight thresholds may be dynamic and may increase or decrease over time. For example, as the number of followers or customers of a software application increase over time, their interaction with content on social media platforms 110 may also increase over time. In such cases, over time, it might become more common for 50 people to like or share a message associated with software application A and therefore the weight thresholds maintained by the weight engine 206 for that application may be updated over time.

To this end, the database 219 may maintain content item descriptors and a monitoring module (not shown) may periodically (e.g., every 30 days) inspect the interaction fields of the content items descriptors in that period to determine whether the average number of interactions with content items for a software application have increased over time. If the monitoring module determines that the average number of interactions have increased over time, it may provide this information to the weight engine 206, which may update the weight thresholds for that software application.

Once the weights module 206 has assigned a weight to a content item, it updates the content item's descriptor as shown in table B.

TABLE B

| Content item descriptor after step 404 | |
| --- | --- |
| Content item ID | 834739 |
| Time created | 23 Apr. 2022, 11:05 am |
| Time last updated | 23 Apr. 2022, 19:07 pm |
| Social media Platform ID | Facebook |
| Software application | Jira Align |
| Content item type | Text |
| Location data | Sydney, Australia |
| Content | "This is unbelievable, my application has crashed again. This has happened for the second time this week. It was working fine until yesterday morning. However, I was unable to login this morning" |
| No. of likes | 1 |
| No. of shares | 5 |
| Segments | — |
| Segment IDs | — |
| Weight | 1.6 |
| Sentiment label and score | — |
| Geospatial cluster | — |
| Link to content item | https://facebook.com/i/web/status/2347983748923 |

Next, at step 406, the textual data of the content items is processed. This may include segmenting larger messages into smaller segments. In one example, textual data containing several sentences is split into smaller segments, each including fewer sentences, e.g., 2-3 sentences. This segmenting of larger messages improves the performance of the sentiment analysis engine 134 because sentiments of help seeking nature generally do not span more than a few sentences. Furthermore, smaller data segments help maintain uniformity across training and inference samples and prevent unexpected processing malfunctions.

If the textual data of a content item is segmented, the featurization module 204 updates the content item descriptor to update the segments field and the segment identifiers field. In addition, it may create segment descriptors for each of the segments that include unique identifiers of the segments, the identifier of the parent content item descriptors and fields for including the sentiment label and sentiment score for the segment. An example of a segment descriptor is illustrated below.

TABLE C

| Example segment descriptor | |
| --- | --- |
| Segment ID | 1 |
| Parent Content item ID | 834739 |
| Content | "This is unbelievable, my application has crashed again. This has happened for the second time this week." |
| Sentiment label and score | — |

As seen in table C, the segment descriptor includes an identifier of the segment and the parent content item, and the actual textual data of the segment. These fields may be populated by the featurization module. The segment descriptor includes other fields as well that are not populated by the featurization module 204. These fields are updated by the sentiment analysis engine 208 as the method proceeds.

Once it is determined whether the textual data for a content item needs to be segmented or not, the featurization module 204 can process the segmented or un-segmented textual data. For example, the featurization module 204 may clean the textual data to remove any elements that do not contribute to the sentiment of the message. These elements may include punctuations, articles, links, URLs, etc. It can also stem certain words in the textual data to produce morphological variants of a root or base word. By way of example, the process of stemming identifies words such as "chocolates," "chocolatey," and "choco" that are all morphological variants of chocolate and replaces them with the root word "chocolate." Another example would be to substitute words such as "retrieval," "retrieved," and "retrieves" with the root word "retrieve." The featurization module 204 may also analyze the textual data to group together different inflected forms of a word so they can be analyzed as a single item. This process is commonly known as lemmatization. By way of example, the process of lemmatization can replace the words "better" with "good." This process essentially transforms various words to an equivalent base form in order to further reduce the total number of words that must be processed by the system in the next stages.

At the end of step 406, the corresponding content item descriptor or segment descriptor may be updated. In particular, the textual data in the content field may be replaced by the processed textual data and the segments and segment identifier fields may be updated if the textual data has been segmented. In other examples, the content item descriptor may include a separate field for the processed textual data and the featurization module 204 updates that field. Table D illustrates an example content item descriptor after step 406.

TABLE D

| Content item descriptor after step 406 | |
| --- | --- |
| Content item ID | 834739 |
| Time created | 23 Apr. 2022, 11:05 am |
| Time last updated | 23 Apr. 2022, 19:07 pm |
| Social media Platform ID | Facebook |
| Software application | Jira Align |
| Content item type | Text |
| Location data | Sydney, Australia |
| Content | "unbelievable my application has crashed again this has happened second time this week working fine until yesterday morning however I was unable to login this morning" |
| No. of likes | 1 |
| No. of shares | 5 |
| Segments | 2 |
| Segment IDs | 1, 2 |
| Weight | 1.6 |
| Sentiment label and score | — |
| Geospatial cluster | — |
| Link to content item | https://facebook.com/i/web/status/2347983748923 |

Next, at step 408, sentiment analysis is performed on the cleaned and processed textual data by the sentiment analysis engine 208 to determine sentiment labels and sentiment scores for each of the content items. In particular, the sentiment analysis engine 208 retrieves the content item descriptors of unsegmented content items and segment descriptors of segmented content items and determines the sentiment labels and sentiment scores for the cleaned and processed textual data and adds the sentiment labels and scores to the corresponding content item descriptors or segment descriptors.

By way of example, textual data fed to the sentiment analysis engine 208 may be "I love using XYZ system best part is wide range of support and easiness to use" and the sentiment analysis engine may output sentiment labels and scores as shown in the example updated segment descriptor shown in table E.

TABLE E

| example segment descriptor after step 408 | |
| --- | --- |
| Segment ID | 1 |
| Parent Content item ID | 23135 |
| Content | "I love using XYZ system best part is wide range of support and easiness to use." |
| Sentiment label and score | label: sadness, score: 0.000679, label: joy, score: 0.995930, label: love, score: 0.000945, label: anger, score: 0.001805, label: fear, score: 0.000411, label: surprise, score: 0.000228 |

If any of the content items were segmented, the sentiment labels associated with segments are aggregated and the segment descriptors are deleted. Sentiment labels usually represent social media user sentiments determined for various segments of a message and not for the entirety of the message. Aggregating sentiment labels and scores reveals the overall sentiment associated with the entire message.

To do so, the sentiment aggregator 210, retrieves all the segment descriptors associated with a given content descriptor (e.g., by performing a lookup for the segment identifiers associated with the content item identifier), retrieves the sentiment labels and scores from each of the segments and aggregates them. In one example aggregation includes calculating an average score for each of the sentiment labels based on the individual scores and number of segments. In other examples, mean or median values may be computed. In still other examples, aggregation may include summing the individual label scores. Once the scores from the segments are aggregated, the content item descriptor may be updated with the sentiment labels and scores for the entire content item and the corresponding segment descriptors may be deleted.

At step 410, a geo-spatial cluster is assigned to the content items if location data is present. To this end, for each content item, the geo-spatial clustering module 212 inspects the content item descriptor to determine the software application associated with the content item and whether any location information is present. If location information is present, the geo-spatial clustering module 212 is configured to retrieve the cluster map associated with the corresponding software application and determine the closest geo-cluster the location data corresponds to in the cluster map. It may then update the content item descriptor with the corresponding cluster name. In the example content item descriptor shown in table A, the geo-spatial cluster may determine that the location of the content item is closest to the 'Australia' cluster and update the cluster field in the content item descriptor accordingly.

At step 412, the incident detection engine 214 determines whether one or more potential incidents have occurred in the relevant time period. To this end, it retrieves the content item descriptors that have been processed in the relevant time period (e.g., last 10 minutes or 30 minutes) and inspects the various fields of these content item descriptors to determine whether an incident has occurred. In some embodiments, the incident detection engine 214 may retrieve content item descriptors that were created in the relevant time period. In other embodiments, the incident detection engine 214 may retrieve content item descriptors that were created or updated in the relevant time period. In some other embodiments, the incident detection engine 214 may only retrieve content item descriptors that were updated in the relevant time period if the number of interactions with the content item exceed a threshold. For example, the incident detection engine 214 may only retrieve content item descriptors that were updated in the relevant time period if the number of likes exceeds hundred likes or the number of shares or retweets exceeds fifty.

In some embodiments, the incident detection engine 214 performs heuristic analysis to make this decision. For instance, the incident detection engine 214 may determine that a potential incident has occurred when one or more thresholds are met. In one example, the incident detection engine 214 may determine that a potential incident has occurred when it determines that at least a threshold number of content items were created or updated within a threshold timespan, where each of the at least threshold number of content items were associated with one or more negative sentiments having sentiment scores exceeding a threshold score. In another example, the incident detection engine 214 may determine that a potential incident has occurred when it determines that at least a threshold number of content items were created or updated within the relevant time period, where each of the at least threshold number of content items were associated with one or more negative sentiments having sentiment scores exceeding a threshold score.

In some particular embodiments, the analysis may be based on the following five hyper parameters or thresholds—

Strong Negative Sentiment Threshold. This is a threshold sentiment score value to classify a social media activity as strongly negative. In the example, where sentiment scores are in the range of 0 to 1, the strong negative sentiment threshold may be, e.g., 0.8.

Weak Negative Sentiment Threshold. This is a threshold sentiment score value to classify a social media activity as weakly negative. An example of this threshold may be a sentiment score of 0.6).

Short Burst Timespan. A time span within which if content items are received they are considered a short burst of social activities. This timespan may be any suitable duration, e.g., 5 minutes, 10 minutes, etc.

Long Burst Timespan. A time span within which if content items are received they are considered a long burst of social media activities. This timespan could be any suitable duration longer than the short burst timespan, e.g., 30 minutes.

Strong Influx Threshold. A minimum number of content items required to be considered a strong influx. Example value of this threshold may be 50 content items.

Weak Influx Threshold. A minimum number of content items required to be considered a weak influx. Example value of this threshold may be 15 content items.

One or more of these hyper parameters or thresholds may be computed and combined at step 414 to determine whether a potential incident has occurred. For example, the incident detection engine 214 may determine that a potential incident has occurred with high probability if it determines that a long burst of a threshold number of content items with strong negative sentiments were received in the relevant time period. For example, if the incident detection engine 214 inspects the 'time created' fields of each of the content item descriptors and determines that 15 or more content items were created in the past 30 minutes and determines that at least 15 of these content items have either a sadness, fear or anger sentiment score higher than 0.8, it may determine that a potential incident has occurred.

In another example, the incident detection engine 214 may determine that a potential incident has occurred with medium probability if it determines that a short burst of a threshold number of content items with strong negative sentiments were received in the relevant time period. For instance, if the incident detection engine 214 inspects the 'time created' fields of each of the content item descriptors and determines that 15 or more content items were created in a 5 or 10 minute window and determines that at least 15 of these content items have either a sadness, fear or anger sentiment score higher than 0.8, it may determine that a potential incident has occurred.

In yet another example, the incident detection engine 214 may determine that a potential incident has occurred with low probability if it detects a long or short burst of strong influx with weak negative sentiments. For instance, if the incident detection engine 214 inspects the 'time created' fields of each of the content item descriptors and determines that 50 or more content items were created in the past short or long time span and determines that at least 50 of these content items have either a sadness, fear or anger sentiment score higher than 0.6, it may determine that a potential incident has occurred.

Other example heuristic rules may also be utilized. For instance, the incident detection engine 214 may determine that a potential incident has occurred if it detects a threshold number of content items with weak or strong negative sentiments in a given geo cluster. In this case, the threshold number of content items may be the same as a weak threshold or even lower. In this case, in addition to the number of content items, their creation times and sentiment scores, the incident detection system also inspects the geo-cluster field of the content item descriptors to determine whether an incident has occurred.

In yet other examples, when determining the number of content items received in a timespan, the incident detection engine 214 may also consider the weight assigned to the content item and may multiply the content item with that assigned weight to determine the total number of content items. For example, if two content items were received in a given period and the assigned weights of the two content items were 2 and 6, the incident detection engine 214 may determine that there are 1×2+1×6=8 content items in that time period. It will be appreciated that the examples provided above are not exhaustive. Many different rules or thresholds may be predefined without departing from the scope of the present disclosure.

It will be appreciated that the threshold values of one or more of the hyper parameters may vary for different software applications. For example, an organization may receive well over 50 activities in any given timeframe in relation to one of their flagship software products, whereas it may rarely receive more than 10 social media activities in the same timeframe for one of its other products. Accordingly, while a value of 50 may indicate a strong influx for one of the software products, it may not indicate a strong influx for the other. Accordingly, tailoring some of the hyper parameters according to the monitored software application can lead to more accurate predictions of incidents.

In alternative embodiments, the threshold values of one or more of the hyper parameters may be dynamic—e.g., the values may change over time. For example, if an organization has recorded an average of 500 social media mentions per 30 minutes in the last month in relation to a software application, but had previously recorded an average of 300 social media mentions in the same period, the strong influx hyper parameter for that software application may be automatically updated from 600 to 1000 (e.g., double of the average) to indicate a realistic strong influx for that software application. In one example, to implement this, the database 219 may maintain a log of the number of content items received for a given software application in every relevant time period and the monitoring module may be configured to inspect these values periodically (e.g., every 30 days) to determine whether one or more of the hyper parameter values need to be updated or not.

If at step 412, the incident detection engine 214 determines that a potential incident has occurred, the method proceeds to step 414, where the incident detection engine 214 determines whether the incident is localized or not. To this end, it may inspect the geo-cluster field of the content items that resulted in the incident to determine if the content items are located around a common geo-cluster or more spread-out. If a threshold number (e.g., 66%) of the content items are assigned to the same geo-cluster or have the same common geo-cluster, the incident detection engine 214 may determine that the incident is localized around that geo-cluster. Alternatively, if different geo-clusters are assigned to the content items, the incident detection engine 214 may determine that the incident is more global.

If at step 414, the incident detection engine 214 determines that the potential incident is localized, it communicates this along with the geo-cluster and the identifiers of the content items that resulted in the decision to the alert generation module at step 416. Otherwise, if the incident detection engine 214 determines that the potential incident is not localized, it communicates the identifiers of the content item descriptors that resulted in the decision to the alert generation at step 418.

At step 420, the alert generation module 216 generates an alert. In one example, the alert generation module 216 may include textual data from the content item descriptors to the alert so that an engineer reviewing the alert can determine why the alert was generated. In addition, the alert generation module 216 may include additional information about the alert such as an alert priority (which may be based on the probability with which the incident detection system detected the potential incident), the software application that the alert is related to, the geographical location associated with the alert (e.g., if the incident was localized), a title (e.g., based on the most common themes or ideas present in the content items), and links to the actual social media messages or posts (if available). In addition, it may include the sentiment labels associated with the content items. FIG. 5 shows an example alert 500 that is generated by alert generation module 216 and its associated information. In particular, the alert includes an alert title, which in this example is, "Alarm: found 5 tweets mentioning "Jira" with emotions anger, sadness, and fear." The alert also includes an alert priority, which is assessed to be P1 in this example. Further still, the alert 500 includes details about the potential incident such as source, responder team it is assigned to, update date/time, and a description of the alert. As depicted in this example, the description includes the content item textual content and links to the actual content items on the social media platform.

At step 416, the monitoring system interface communicates the alert to the monitoring system 120.

At step 412, if the incident detection engine 214 does not determine that a potential incident has occurred, the method 400 may end.

The flowcharts illustrated in the figures and described above define operations in particular orders to explain various features. In some cases, the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

For example, although method 400 is described such that the SM gateway module 202 receives the social media content items periodically. This need not be the case. In other implementations, the SM gateway module 202 may receive social media content items in real time as and when they are generated. In this example, method steps 402-410 (of creating content item descriptors, processing the content items, generating weights, determining geo-clusters and sentiment scores) are performed for individual content items and the updated content item descriptors are stored in the database 219. These method steps may be continuously performed as and when the alert generation system 130 receives content items, whereas the steps 412-416 may be performed periodically once the relevant time period has elapsed. In such cases, the incident detection engine 214 may retrieve the content item descriptors created in the relevant time period from the database 219 and perform step 412.

Further, it will be appreciated that in some embodiments, the method steps 404 (assigning weights) and 410 (determining geo-clusters) may be omitted. In this case, the incident detection engine 214 may determine if a potential incident has occurred based on the number of content items and the sentiment scores.

Unless otherwise stated, the terms "include" and "comprise" (and variations thereof such as "including," "includes," "comprising," "comprises," "comprised," and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage, or attribute that is not expressly recited in a claim should be considered as a required or essential feature. Accordingly, the specification and drawings are to be regarded in an illustrative rather than a restrictive sense.

The invention claimed is:

1. A computer-implemented method, comprising:
collecting, from a server of a social media platform, a plurality of content items meeting a first set of relevance criteria, wherein:
the first set of relevance criteria comprises:
a first criterion that is met when each content item of the plurality of content items was at least one of created and updated at the social media platform during a first time period;
a second criterion that is met when each content item of the plurality of content items includes respective textual data including a reference to a software application; and
each content item of the plurality of content items includes respective interaction information; and
for each content item of the plurality of content items:
analyzing the respective interaction information to determine a respective weight factor;
processing the respective textual data, using a sentiment analysis engine, to obtain a respective sentiment score, the sentiment analysis engine including a trained machine learning model;
applying the respective weight factor to the respective sentiment score to obtain a respective weighted sentiment score; and
generating a geo-spatial cluster map comprising a plurality of geo-spatial clusters corresponding to a plurality of locations associated with users of the software application; and

determining a first geo-spatial cluster of the plurality of geo-spatial clusters that is associated with a subset of the plurality of content items, including:
  for each content item of the subset of the plurality of content items:
    in accordance with a determination that a respective content item of the plurality of content items includes geolocation data, determining, based on the geo-spatial cluster map, a geo-spatial cluster of the plurality of geo-spatial clusters closest to the geolocation data for the respective content item of the plurality of content items, the determined geo-spatial cluster corresponding to the first geo-spatial cluster;
    updating a content item descriptor associated with the respective content item of the plurality of content items with an indication of the first geo-spatial cluster; and
  aggregating the weighted sentiment scores of each content item of the subset of the plurality of content items to obtain a combined sentiment score for the first geo-spatial cluster;
in response to the combined sentiment score for the first geo-spatial cluster not exceeding a sentiment threshold, determining that a localized incident associated with the first geo-spatial cluster has not occurred; and
collecting, from the server, a first content item meeting a second set of relevance criteria and including first interaction information, wherein the second set of relevance criteria comprises:
  a third criterion that is met when the first content item was at least one of created and updated at the social media platform during a second time period;
  a fourth criterion that is met when the first content item includes first textual data and a reference to the software application; and
analyzing the first interaction information to determine a first weight factor;
processing the first textual data, using the sentiment analysis engine, to obtain a first sentiment score;
applying the first weight factor to the first sentiment score to obtain a first weighted sentiment score;
determining that the first content item is associated with the first geo-spatial cluster;
updating a first content item descriptor associated with the first content item with an indication of the first geo-spatial cluster;
aggregating the first weighted sentiment score and the combined sentiment score to obtain an updated combined sentiment score for the first geo-spatial cluster; and
in accordance with a determination that the updated combined sentiment score for the first geo-spatial cluster exceeds the sentiment threshold:
  identifying a localized incident occurrence corresponding to the first geo-spatial cluster and relating to the software application; and
  generating an alert message for a user, the alert message including:
    an indication of the localized incident occurrence;
    a geographical region associated with the first geo-spatial cluster;
    at least one link to at least one content item associated with the first geo-spatial cluster; and
  causing to be displayed, in an interface of a monitoring system associated with the user, the alert message.

2. The computer-implemented method of claim 1, wherein each sentiment score is associated with a respective sentiment label indicating a positive sentiment or a negative sentiment.

3. The computer-implemented method of claim 2, wherein:
  determining the localized incident occurrence includes determining whether at least a first threshold number of the plurality of content items were created or updated within a threshold timespan; and
  each of the at least the first threshold number of the plurality of content items are associated with sentiment scores exceeding a threshold score.

4. The computer-implemented method of claim 2, wherein:
  determining the localized incident occurrence includes determining whether at least a second threshold number of the plurality of content items were created or updated within the first time period; and
  each of the at least the second threshold number of the plurality of content items are associated with sentiment scores exceeding a threshold score.

5. The computer-implemented method of claim 4, wherein at least one of the second threshold number of the plurality of content items and the threshold score is a dynamic threshold value that varies over time.

6. The computer-implemented method of claim 2, wherein analyzing the interaction information includes determining a frequency of interactions with the content item.

7. The computer-implemented method of claim 1, wherein determining the localized incident occurrence further comprises determining whether a third threshold number of content items of the subset of the plurality of content items are assigned to a common geo-cluster.

8. The computer-implemented method of claim 1, further comprising:
  segmenting a content item of the plurality of content items into two or more segments if the textual data of the content item includes more than a threshold number of sentences;
  receiving, from the sentiment analysis engine, a segment sentiment score for each segment of the two or more segments; and
  aggregating the segment sentiment scores for each segment of the two or more segments to determine the sentiment score for the content item.

9. A non-transitory computer readable medium comprising instructions, which when executed by a processing unit, cause the processing unit to:
  collect, from a server of a social media platform, a plurality of content items meeting a first set of relevance criteria, wherein:
    the first set of relevance criteria comprises:
      a first criterion that is met when each content item of the plurality of content items was at least one of created and updated at the social media platform during a first time period; and
      a second criterion that is met when each content item of the plurality of content items includes respective textual data including a reference to a software application; and
    each content item of the plurality of content items includes respective interaction information; and
  for each content item of the plurality of content items:
    analyze the respective interaction information to determine a respective weight factor;

process the respective textual data, using a sentiment analysis engine, to obtain a respective sentiment score, the sentiment analysis engine including a trained machine learning model;

apply the respective weight factor to the respective sentiment score to obtain a respective weighted sentiment score;

generate a geo-spatial cluster map associated with the software application and including a plurality of geo-spatial clusters corresponding to a plurality of locations associated with users of the software application; and determine a first geo-spatial cluster of the plurality of geo-spatial clusters that is associated with a subset of the plurality of content items, including:

for each content item of the plurality of content items:

in accordance with a determination that a respective content item of the plurality of content items includes geolocation data, determine, based on the geo-spatial cluster map, a geo-spatial cluster of the plurality of geo-spatial clusters closest to the geo-location data for the respective content item of the plurality of content items, the determined geo-spatial cluster corresponding to the first geo-spatial cluster;

update a content item descriptor associated with the respective content item of the plurality of content items an indication of with the first geo-spatial cluster; and aggregate the weighted sentiment scores of each content item of the subset of the plurality of content items to obtain a combined sentiment score for the first geo-spatial cluster;

in response to the combined sentiment score for the first geo-spatial cluster not exceeding a sentiment threshold, determine that a localized incident associated with the first geo-spatial cluster has not occurred; and collect, from the server, a first content item meeting a second set of relevance criteria and including first interaction information, wherein the second set of relevance criteria comprises:

a third criterion that is met when the first content item was at least one of created and updated at the social media platform during a second time period;

a fourth criterion that is met when the first content item includes first textual data and a reference to the software application; and analyze the first interaction information to determine a first weight factor;

process the first textual data, using the sentiment analysis engine, to obtain a first sentiment score;

apply the first weight factor to the first sentiment score to obtain a first weighted sentiment score:

determine that the first content item is associated with the first geo-spatial cluster;

update a first content item descriptor associated with the first content item with an indication of the first geo-spatial cluster;

aggregate the first weighted sentiment score and the combined sentiment score to obtain an updated combined sentiment score for the first geo-spatial cluster; and in accordance with a determination that the updated combined sentiment score for the first geo-spatial cluster exceeds the sentiment threshold:

identify a localized incident occurrence corresponding to the first geo-spatial cluster and relating to the software application; and generate an alert message for a user, the alert message including:

an indication of the localized incident occurrence;

a geographical region associated with the first geo-spatial cluster;

at least one link to at least one content item associated with the first geo-spatial cluster; and cause to be displayed, in an interface of a monitoring system associated with the user, the alert message.

10. The non-transitory computer readable medium of claim 9, wherein:

each sentiment score is associated with a sentiment label indicating a positive sentiment or a negative sentiment by the sentiment analysis engine.

11. The non-transitory computer readable medium of claim 10, wherein:

determining the localized incident occurrence includes determining whether at least a first threshold number of the plurality of content items were created or updated within a threshold timespan; and each of the at least the first threshold number of the plurality of content items are associated with sentiment scores exceeding a threshold score.

12. The non-transitory computer readable medium of claim 10, wherein:

determining the localized incident occurrence includes determining whether at least a second threshold number of the plurality of content items were created or updated within the first time period; and each of the at least the second threshold number of the plurality of content items are associated with sentiment scores exceeding a threshold score.

13. The non-transitory computer readable medium of claim 12, wherein at least one of the second threshold number of the plurality of content items and the threshold score is a dynamic threshold value that varies over time.

14. The non-transitory computer readable medium of claim 10, wherein the weight factor is based on a frequency of interactions associated with the content item.

15. The non-transitory computer readable medium of claim 9, further comprising instructions which when executed by the processing unit cause the processing unit to determine the localized incident occurrence if a third threshold number of content items of the subset of the plurality of content items are assigned to a common geo-cluster.

16. The non-transitory computer readable medium of claim 9, further comprising instructions which when executed by the processing unit cause the processing unit to:

segment the textual data of each content item into two or more segments if the textual data of the content item includes more than a threshold number of sentences;

process, using the sentiment analysis engine, the two or more segments individually to obtain a segment sentiment score for each segment of the two or more segments; and aggregate the segment sentiment scores for each segment of the two or more segments to determine the sentiment score of the content item.

* * * * *